United States Patent Office 3,418,400
Patented Dec. 24, 1968

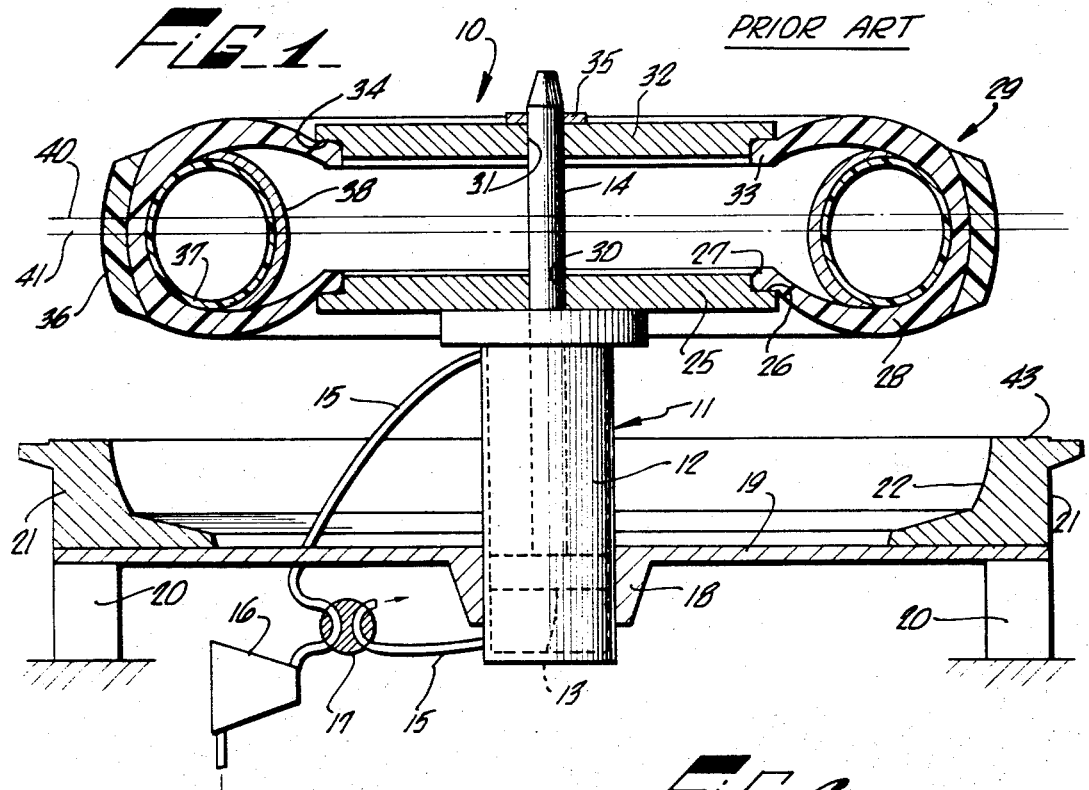
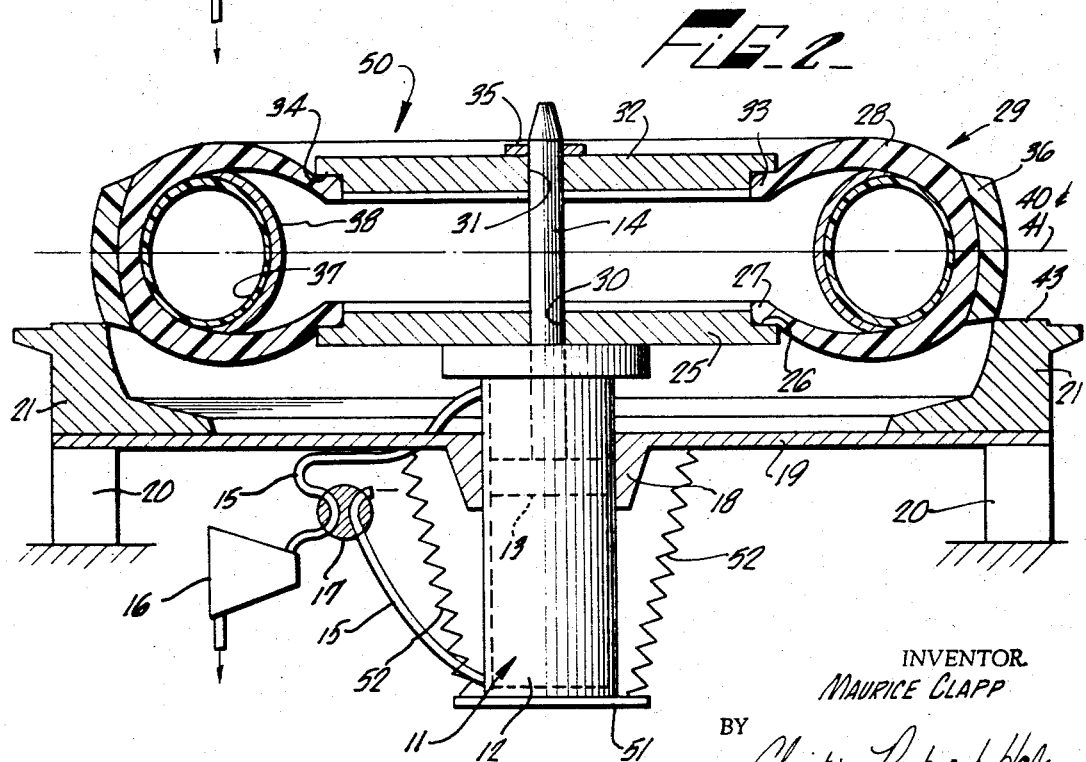

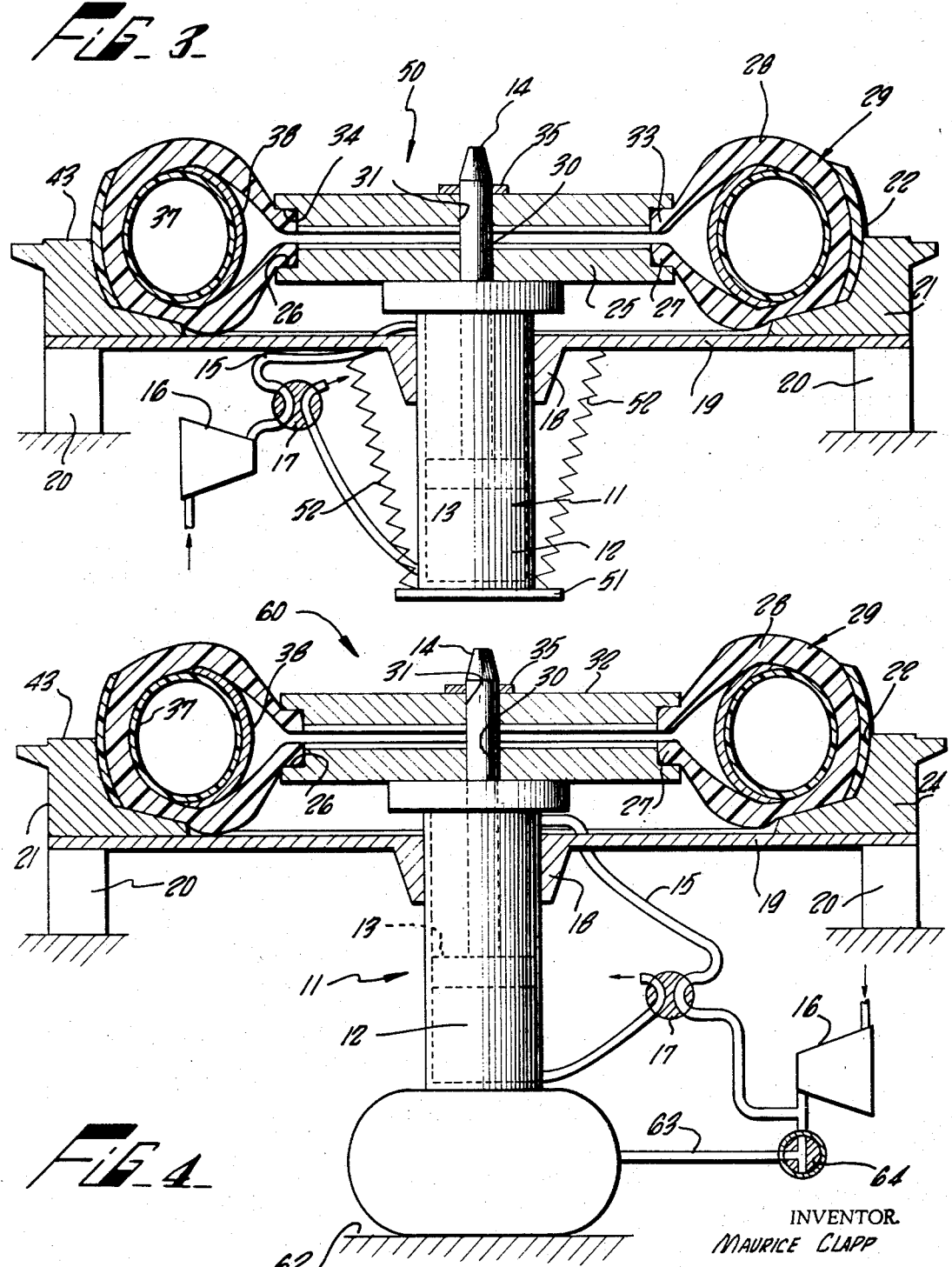

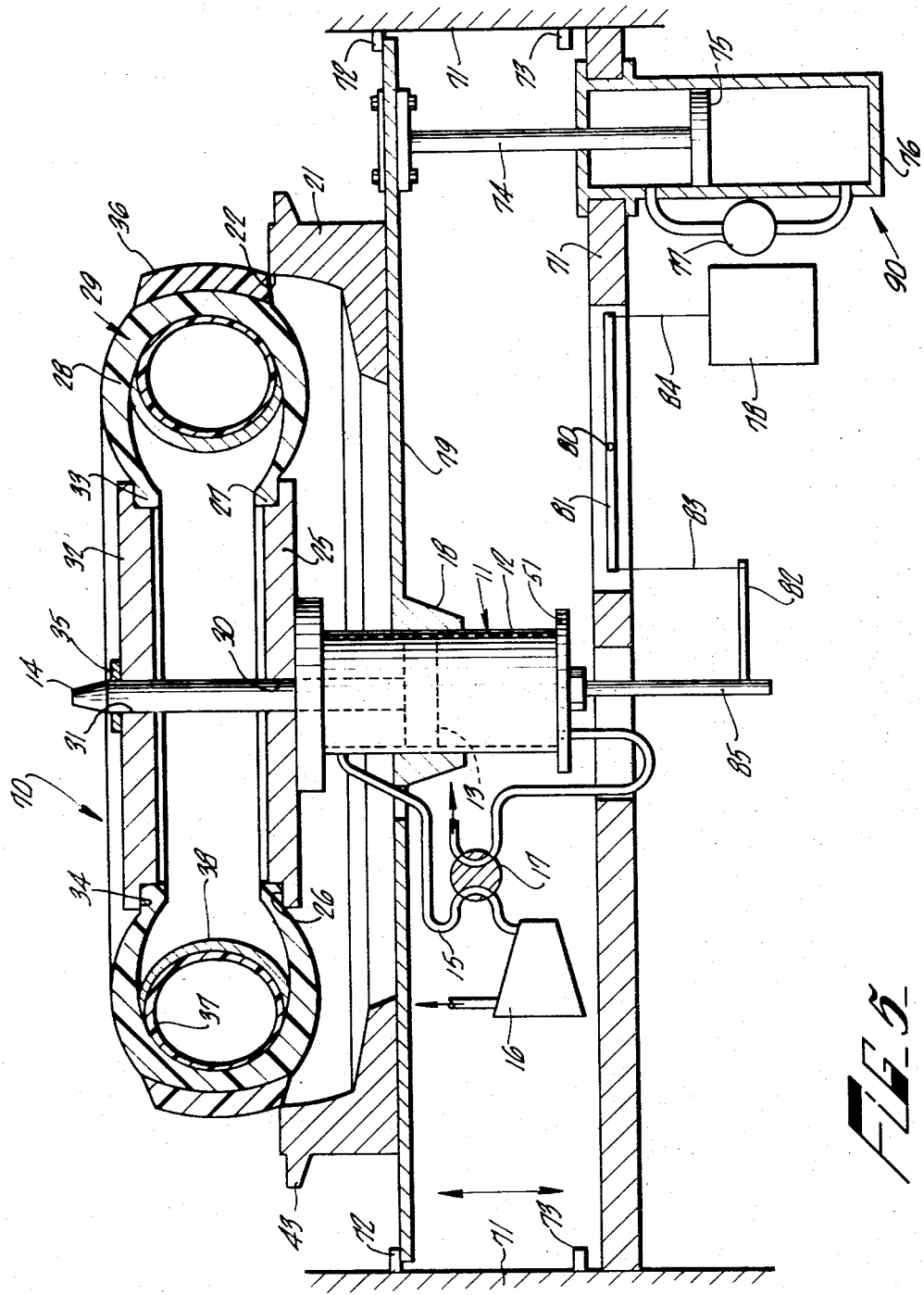

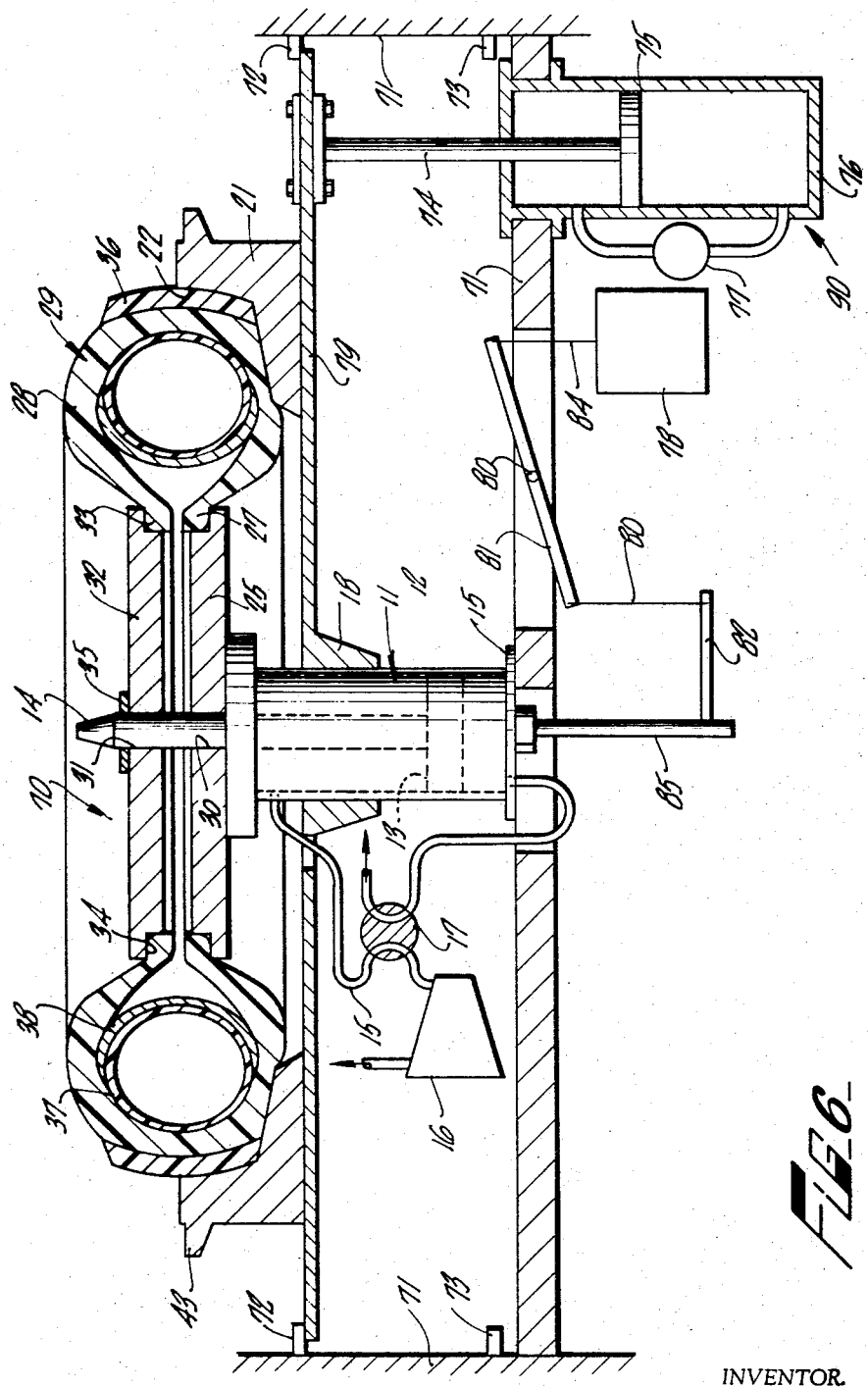

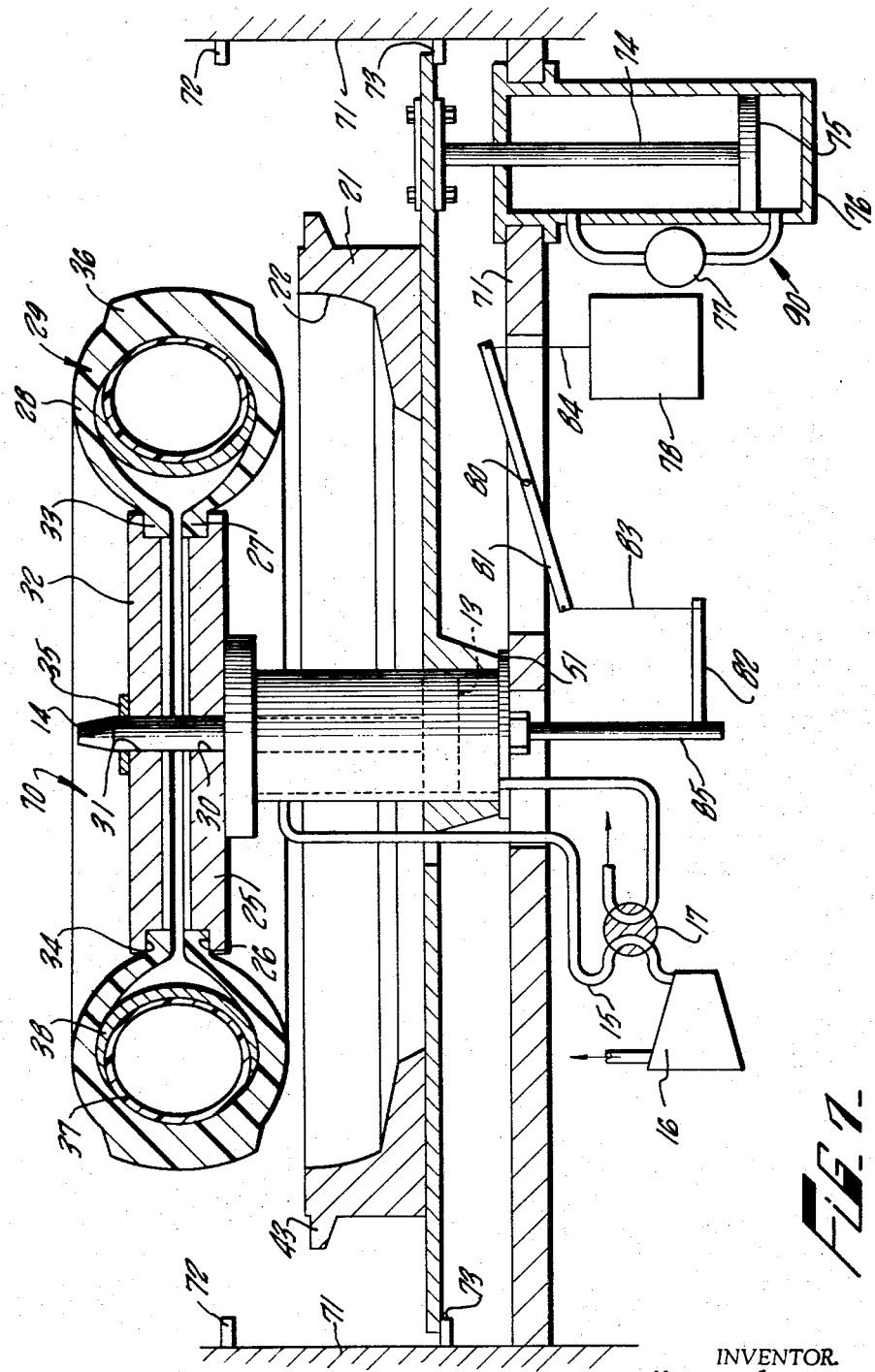

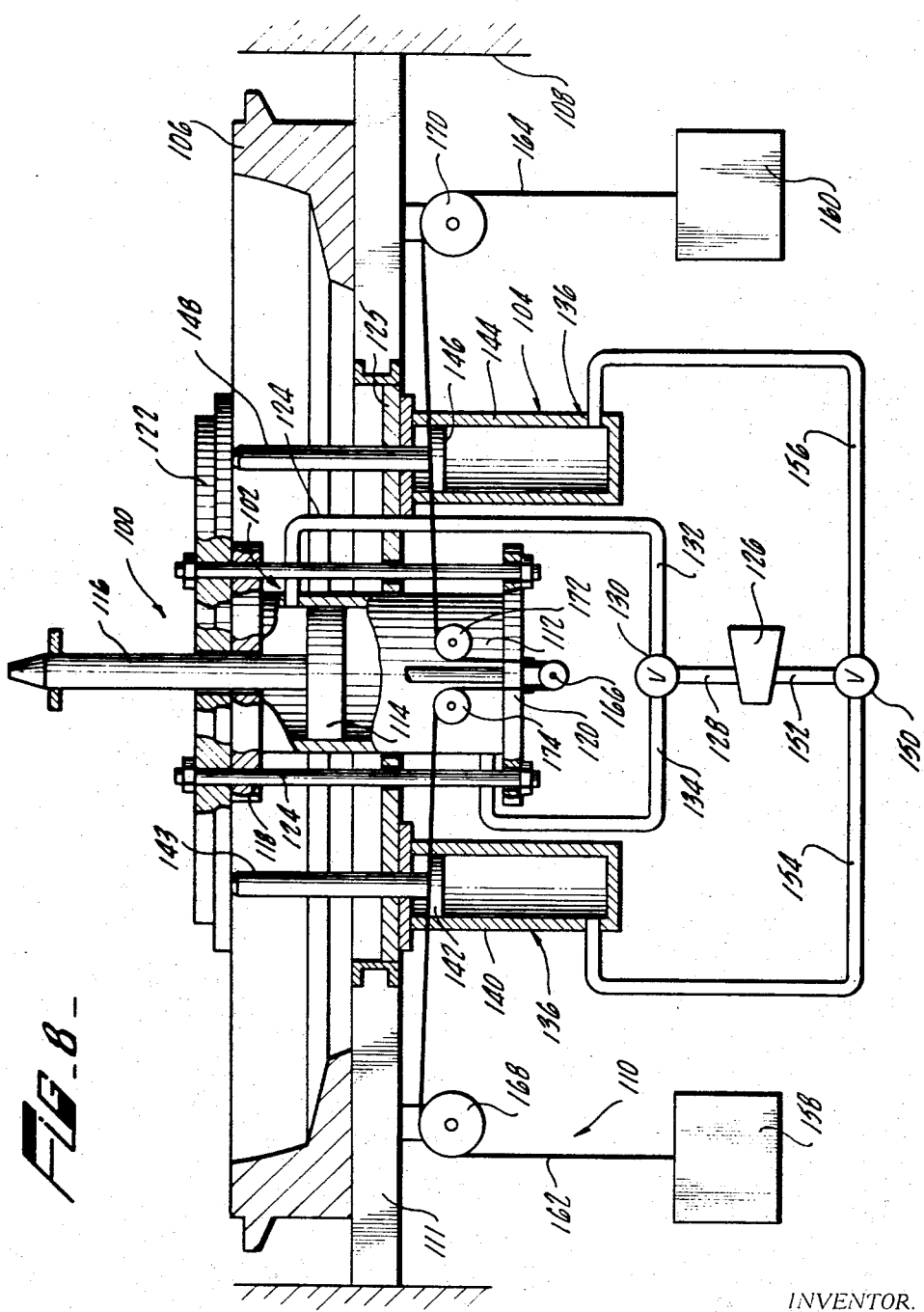

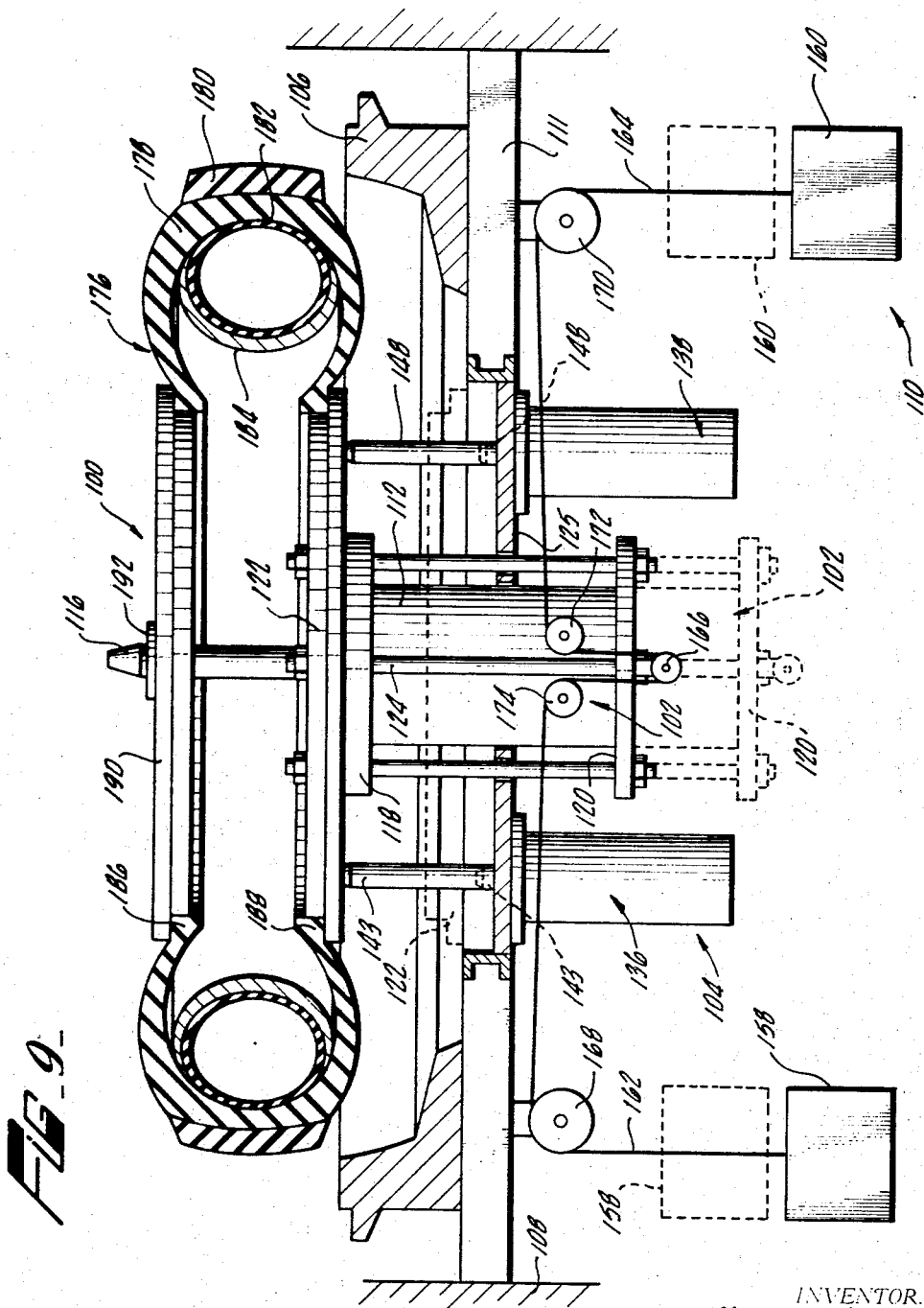

3,418,400
METHOD AND APPARATUS FOR ELIMINATING TIRE DROOP
Maurice Clapp, 1709 Rossmont, Redlands, Calif. 92373
Continuation-in-part of application Ser. No. 544,180, Apr. 21, 1966. This application July 17, 1967, Ser. No. 660,549
19 Claims. (Cl. 264—36)

ABSTRACT OF THE DISCLOSURE

A tire retreading apparatus employs a counterbalance to carry the weight of the ram assembly used to draw the tire's beads together during the insertion of the tire into a lower mold matrix. Before the beads are drawn together, the tire is supported around its periphery along the parting surface of the lower mold matrix. As the beads are being drawn together, the counterbalance floats its carried weight and by a shift of load from the parting surface to the ram assembly allows the tire to seat in the lower matrix.

Cross reference to related applications

This is a continuation-in-part application of application Ser. No. 544,180, filed Apr. 21, 1966, and now abandoned.

Background of the invention

This invention relates to the art of tire retreading and, more particularly, to an apparatus and method for the handling of tires to be retreaded in such a manner that the problem of off-center treads is eliminated.

The construction of modern automobile and truck tires has presented serious problems for tire retreaders. One of the most serious of these problems is in the production of off-center treads by the retreading process. An off-center tread is produced when the tread molded onto a tire is off-center relative to the center plane of the tire. This asymmetrical condition results from supporting the tire only along its beads prior to its insertion into the lower mold matrix of a vulcanizing apparatus. So disposed, the unsupported weight of the bulk of the tire together with the weight of the accessory apparatus used in the retreading process distorts the tire by causing axial displacement of the tread relative to the tire's beads. This problem is especially serious with two-ply and low-profile tires. In two-ply tires there is a very light sidewall which is incapable of supporting the weight of the tire and the retreading apparatus used. Low profile tires have an extra large cross section which concentrates the tire's weight in its tread section. In short, the added weight or limited stiffness of today's sidewalls causes tire droop which, unfortunately, persists throughout the retreading process.

In greater detail, the prior art retreading process which is responsible for the off-center tread condition is commenced by removing the old tread rubber to expose the tire's carcass. A band of unvulcanized rubber, which ultimately becomes the new tread, is cemented around the circumference of the carcass. The carcass and cemented rubber band are then prepared for the vulcanization process. The mold halves or matrices used in this process include ridges which define the finished tire's tread pattern. These matrices must be undersized relative to the carcass and cemented rubber strip. The undersized matrices require a reduction in the diameter of the tire prior to its placement in the matrices. After a curing rim and an inflatable air bag are placed inside the tire's carcass, the tire diameter reduction step is accomplished by engaging a pair of bead clamping members on the beads of the tire and drawing the members together with the carcass spaced above the lower matrix of an open tire mold. This process, especially when used on two-ply and low-profile types, results in the axial displacement of the tire's tread relative to its normal or symmetrical center plane by creating the condition which produces the off-center treads. In short, tread misalignment is produced by allowing the tire's carcass together with the added weight of the air bag and curing rim to remain unsupported during the diameter reduction process and before placement in the lower mold matrix. Once the droop or sagging condition exists, it is not overcome by the subsequent support of the tire in the lower mold matrix. With a displaced tread during the molding process, a reconditioned tire will be unbalanced and wear unevenly.

Summary of the invention

The instant invention provides a simple and effective apparatus and method for overcoming the off-center tread problem and an improved method and apparatus generally applicable in the retreading art.

Briefly, the invention adds to the prior art retreading apparatus means for supporting the peripheral or outer circumferential edge of the tire to be retreaded before and during the tire's reduction in diameter and placement in the lower mold matrix. In addition, the transfer in the load felt by the peripheral support means to the bead support or clamping members which occurs as the tire is being reduced in diameter is used to activate means for lowering the tire into the lower mold matrix. The tire lowering means preferably utilizes a counterbalance which is sensitive to the transferred forces acting through the clamping members but which counteracts the weight forces of these clamping members and their associated apparatus which would otherwise distort the tire.

In greater detail, the invention contemplates the support of the outer circumferential edge of the tire on the parting surface of the lower mold matrix. The ram assembly used to draw the tire beads together is supported in a floating condition by the counterbalance. As the beads are drawn together by the action of the ram assembly on the bead clamping members, the load supported by the parting surface is gradually transferred to the ram assembly and, hence, the counterbalance. With the increase in load, the counterbalance allows the ram assembly and its carried clamping members to gradually lower the tire into the matrix. The ram assembly is preferably in the form of a fluid actuated piston and cylinder combination with a shaft attached to the piston. The shaft engages the upper bead clamping member and, upon application of fluid pressure on the piston, forces the cooperating bead clamping members close together. The initial support of the tire on the parting surface may be accomplished in two ways. Initially, the lower mold matrix may be carried by a mounting plate which is vertically positionable with respect to the ram assembly. In its lower position, the mounting plate frees the lower mold matrix from the ram assembly in order to mount the tire in the bead clamping members prior to its reduction in diameter. Alternately, the ram assembly may be made vertically positionable with respect to a fixed lower mold matrix to allow for tire mounting in the bead clamping members. The stationary lower mold matrix embodiment is preferred when large tires are to be retreaded because the great weight of large mold matrices renders the positioning of the ram assembly more economical and practical. In either case, the lower mold matrix or the ram assembly is preferably positioned by a second ram assembly of one or more pistons and cylinders which are operable to engage and correctly position their carried structure.

A tire to be retreaded is initially supported along its periphery by the parting surface of the lower mold matrix. As the tire's diameter is reduced by the drawing together of the bead clamping members, the load carried by the lower mold matrix is transferred to these members. The load on the bead clamping members is carried by the counterbalance which positions the beads of the tire and lowers their position as the load on the counterbalance increases. As the load originally supported by the mold matrix is transferred to the counterbalance, the tire's periphery lowers into the mold matrix in unison with the tire's beads. The support provided by the lower mold matrix insures that the vulcanization process is initiated with the tire in a symmetrical condition. The gradual shift of load from the matrix to the counterbalance and the correlation of this shift to bead position maintain the symmetrical condition. In short, the initial support of the periphery of the tire and the utilization of the load transferred from the initial support to the counterbalance to lower the tire into the lower mold matrix eliminate the problem of off-center treads.

These and other features, aspects and advantages of the instant invention will become more apparent from the following description, appended claims and drawings.

*Brief description of the drawings*

FIGURE 1 is a cross-sectional elevation view of apparatus according to the prior art;

FIGURE 2 is a cross-sectional elevation view of one embodiment of the present invention;

FIGURE 3 is a cross-sectional elevation view of the apparatus shown in FIGURE 2 illustrating the terminal stages of process of this invention;

FIGURE 4 is a cross-sectional elevation view of another embodiment of the apparatus of this invention upon which the method of the present invention may be practiced;

FIGURE 5 is a cross-sectional elevational view of still another embodiment of the instant invention;

FIGURE 6 is a cross-sectional elevational view of the embodiment shown in FIGURE 5 with the tire in place in the lower matrix half;

FIGURE 7 is a cross-sectional elevational view of the embodiment shown in FIGURES 5 and 6 after the tire has been vulcanized;

FIGURE 8 is a cross-sectional elevational view of still another embodiment of the present invention; and FIGURE 9 is a cross-sectional elevational view of the embodiment illustrated in FIGURE 8 illustrating the method of the present invention.

*Description of the preferred embodiments*

FIGURE 1 shows a prior art tread centering device 10 which includes a pneumatic ram 11 comprised of a cylinder 12, a piston 13, and a shaft 14 connected to the piston and extending upwardly from the cylinder. High pressure air is supplied to the cylinder through suitable flexible hoses 15 from a compressor 16 via a 4-port control valve 17 which is operable to supply the high pressure air to either end of the cylinder. The cylinder is slidably mounted in a vertically bored boss 18 of a mounting plate 19. The mounting plate is supported on legs 20.

A lower mold matrix 21 is mounted on mounting plate 19 concentric to the vertical line along which shaft 14 and cylinder 12 are movable. The matrix defines an upwardly open, annular mold cavity 22 concentric to the ram. Matrix 21, in cooperation with a similarly configured, downwardly open, upper mold matrix (not shown, but see my prior Patent 2,948,924), comprises a retread mold which, when closed, encompasses the tread of a tire to be retreaded and exposes the beads of the tire. Both matrices are equipped with means for heating a tire engaged therein to vulcanize new rubber to the carcass of the tire to be retreaded, and for molding a desired tread design into the new rubber; the tread design is defined by ridges (not shown) extending into the mold cavity from the matrices.

In accord with the tire handling procedures practiced prior to the development of the present invention, cylinder 12 is shown in FIGURE 1 to be positioned so that its upper end is disposed above matrix 21. A lower bead clamping member 25 is fixed to the upper end of the cylinder concentric to piston shaft 14. The lower clamping member has an upwardly open groove 26 about its circumference. The groove is configured to receive the lower bead 27 of the carcass 28 of a tire 29 to be retreaded. Shaft 14 passes through a central bore 30 in bead clamping member 25 and through a central bore 31 in an upper bead clamping member 32 engaged on and supported by the upper bead 33 of the tire. Bead 33 is engaged in a downwardly open, circumferential groove 34 in the upper clamping member. The upper clamping member is secured from movement upwardly relative to shaft 14 by a pin 35 passed through the shaft and engaged with the upper surface of the clamping member.

Carcass 28 has secured to it a band 36 of new unvulcanized rubber. The band is cemented to the circumference of the carcass after the old tread material has been removed from the carcass. The carcass with band 36 attached, however, is too large in diameter to fit into matrix 21. Thus, after an inflatable air bag 37 and an annular curing rim 38 have been disposed in the carcass in the relation illustrated, the carcass is engaged between the bead clamping members in the manner described and the clamping members are moved together by operation of ram 11 to cause the beads to move together. As the beads are moved together, the diameter of the tire (the diameter of the tire being measured in a horizontal plane) is reduced until the carcass, with band 36 attached, can be fitted into mold cavity 22. In the prior art tire handling procedures, the beads are closed while the tire is supported above matrix 21. After the tire has been positioned in the matrix, the air bag is inflated.

It is desired that tire 29 maintain a symmetrical shape relative to a plane (see line 40 in FIGURE 1) passing horizontally through the tire midway between beads 27 and 33 as the beads are closed. However, where the carcass is of lightweight construction or where band 36 is very thick, the carcass is not able to support the weight of itself and of the air bag and curing rim disposed in the carcass. Thus, in cross-section as shown in FIGURE 1, the tire droops or sags relative to the clamping members so as to have an asymmetrical cross-sectional configuration wherein the centerline (see line 41 in FIGURE 1) of the tread is disposed below the plane 40. The tire maintains this asymmetry as the beads are closed. The band of new rubber is thus unevenly stressed and, when the tire is cured in the mold, the tread molded into the new rubber will be off-center relative to the beads when the tire is removed from the mold.

Two different stages of tire handling utilizing the method and apparatus of the present invention are shown in FIGURES 2 and 3. There is illustrated the inventive tire centering device 50 which is similar to device 10 shown in FIGURE 1 except that cylinder 12 of ram 11 is mounted on a carrier plate 51 and suspended from mounting plate 19 by a plurality of tension springs 52. Springs 52 collectively have a spring constant such that they "float" tire 29 on lower mold matrix 21 before and during performance of the process of drawing the beads of the tire close together; that is, the springs 52 provide a counterbalancing force to absorb the load which would otherwise act on the beads of a tire. The springs have a stiffness selected to allow the tire to move downwardly into contact with the matrix until the matrix carries that portion of the weight of the tire, the air bag and the curing rim which causes the tire to droop or sag into the asymmetrical cross-sectional tire configuration illustrated in FIGURE 1. The springs support the remaining weight of the tire, the air bag, and the curing rim and all the weight of bead clamping members 25 and 32, and ram 11; this avoids distortion of the tire which would otherwise be produced if the collective weight of these items were allowed to act through clamping members 25 and 32 while the periphery of the tire was supported by the parting surface 43 of mold matrix 21.

The practice of the method is commenced by disposing tire 29, with the deflated air bag 37 and curing rim 38 inserted therein, on the lower mold matrix 21 concentric to the axis of the mold cavity 22. The tire beads at this point are engaged between clamping members 25 and 32 in their normal or expanded condition. This array is accomplished by first supporting the tire on the lower matrix 21 followed by the engagement of the clamping members 25 and 32 with the beads. Alternatively, this condition can be achieved by setting the tire on the lower clamping member 25 when the latter is positioned above the lower matrix 21 and then placing the upper clamping member 32 on shaft 14 in engagement with bead 33 allowing the springs 52 to attain an initial equilibrium condition with the tire supported on the matrix 21 as described. In either case, the result is that the periphery of the tire is supported on matrix 21 without sag relative to its beads and the tread centerline 41 is coincident with plane 40 bisecting the space between the beads.

Next, ram 11, comprising selectively operable means connected to the bead clamping members for moving the tire beads close together to reduce the diameter of the tire, is operated to cause the bead clamping members to be moved together. As the beads are moved together and the diameter of the tire is reduced, the line of contact between the tire and the matrix moves radially outward relative to the tire (inwardly relative to the matrix 21). The portion of the weight of the tire and its associated apparatus which is carried by springs 52 is increased and the springs elongate proportionally. Thus, the bead clamping members 25 and 32, and the ram 11 are moved downwardly an amount related to the reduction of tire diameter. The tire, however, is supported during this operation so that it does not sag relative to its beads and a symmetrical tire cross-sectional configuration is maintained.

FIGURE 2 shows tire 29 initially supported on matrix 21 at the junction between an upwardly opening parting surface 43 of the matrix 21 and its cavity 22. During the initial stages of tire diameter reduction, the tire will be supported on the matrix along this line. As diameter reduction continues, the tire will begin to enter the mold cavity 22 with the surface of the cavity supporting the periphery of the tire and the tire "floated" relative to the matrix in order to prevent tire distortion. Normally, however, when the diameter reduction process reaches a given point, the tire attains sufficient rigidity to resist the sagging moment placed on the tire by the weight of the carcass, the air bag, and the curing rim; but because of the constant contact by the mold surface, this rigidity factor need not be relied upon.

The process of reducing the diameter of the tire and lowering the tire into the matrix progresses until the tire is seated in the matrix as shown in FIGURE 3. Thereafter the air bag is inflated, the mold is closed, and the tire is cured.

After the tire has been cured, the tire is removed from the matrix, and, after the tire is positioned above the matrix, the clamping members are moved apart and the retreaded tire is removed from device 50.

FIGURE 4 shows a tire centering device 60 which is similar to device 50 except that an inflatable bladder 61 is provided to support ram 11 relative to matrix 21. The bladder is engaged between the lower end of cylinder 12 and a floor 62 below boss 18 of mounting plate 19. The bladder is connected to compressor 16 via an air hose 63 and a three-part rotary plug valve 64. The bladder is inflated so that it supports the tire in the same manner as do springs 52 of device 50. As the ram is operated and more and more of the weight of the tire is borne by clamping members 25 and 32, the air in bladder 61 is compressed and the ram moves downwardly an amount related to the amount the tire is reduced in diameter. If desired, a compression spring having a selected spring constant equal to the spring constant of the system of springs 52 may be used instead of bladder 61.

FIGURES 5, 6 and 7 illustrate a preferred form of the apparatus of the instant invention which is especially suitable for automobile tires. The differences between the device 70 and the embodiments previously described reside in the use of a counterweight 78 as the counterbalancing means for the axial load placed on the beads of the tire and the provision of a movable mounting plate 79. The counterbalancing means is provided by counterweight 78 attached by a cable 84 to a lever 81 which in turn is pivoted at point 80 on frame 71. At the other end of the lever 81 is a cable 83 attached to extension 85 through pin 82. As before, the counterweight 78 and its attendant apparatus are disposed in relation to the ram 11 and clamping members 25 and 32 to offset the loads which would otherwise be carried by the beads 33 and 27 of tire 29.

The use of a counterweight system is preferred because of the inherent ease of its use, reliability, sensitivity to load changes, and ease of adjustment of compensate for differences in expected loads. The mounting plate 79 has an axially bored boss 18 which slidably receives cylinder 12 of ram 11. Vertical movement is provided through the use of a piston and cylinder combination 90, preferably operated in a standard manner through the use of hydraulic pump 77. This combination comprises cylinder 76, piston 75, and rod 74 secured to mounting plate 79 as illustrated. Upward movement of the mounting plate 79 is arrested through the provision of vertical stops 72 and downward movement is arrested through the provision of stops 73. Both stops are fixed to frame 71 as is cylinder 76. Downward movement of ram 11, through the transfer of load from the parting surface 43 of the mold matrix 21 to the ram 11, is terminated when carrier plate 51 contacts the frame 71.

As in the previously described embodiments, the complete retreading apparatus is not shown, there being absent the complementary upper mold matrix, which is adapted to cooperate with the lower mold matrix 21, and its attendant positioning and securing apparatus. With this absence in mind, the preferred manner for operating the inventive device 70 will now be described. The lower mold matrix 21 and the mounting plate 79 are positioned on lower stops 73 through the manipulation of the hydraulic system 77. Tire 29 is then positioned on the lower bead clamping member 25. The lower mold matrix 21, which is carried by mounting plate 79, is then raised to contact the periphery of the tire 29 (as illustrated in FIGURE 5) through fluid pressure acting on the bottom portion of the piston 75 and cylinder 76. The weight of the tire with its attendant curing rim 38 and inflatable bag 37 is then supported by the parting surface 43 of the lower mold matrix 21. Through this support of tire 29, drooping or sagging is eliminated. Because at this point there is relatively little if any load on the beads, the raising of the lower mold matrix 21 to support the periphery of the tire 29 may well unseat the beads 27 from the lower clamping member 25 without deleterious effect to the finished retreaded tire.

After the lower mold matrix 21 is so positioned, the upper bead clamping member 32 is inserted over shaft 14 and engaged on beads 33 of time 29. The clamping members 25 and 32 are then brought together through operation of the ram 11 in the same manner as illustrated in U.S. Patent 2,948,924. As the clamping members 25 and 32 are brought together, the diameter of the tire 29 is reduced and the load supported by the mold matrix 21 gradually shifts to the ram 11 through lower clamping member 25 allowing the ram 11 to move downwardly with respect to the mounting plate 79 through the bore in its boss 18. With this movement, the counterweight 78 moves up slightly.

Thus through this transfer of load, the tire is allowed to seat itself properly in the cavity 22 of lower mold matrix 21 as shown in FIGURE 6. The upper mold matrix is then placed in its proper position relative to the tire 29 and the lower mold matrix 21, the clamping members are separated, the inflatable bag 37 inflated, and the curing and retreading of the tire accomplished. After the tire has been retreaded, the clamping members 32 and 25 are once again brought together to reduce the diameter of the tire and to free it from the mold matrices. With the reduction in tire diameter, the upper mold matrix is removed and the lower mold matrix 21 is lowered with respect to the tire and the ram 11. During this lowering, the frame 71 supports the ram 11 through carrier plate 51. This state is shown in FIGURE 7. The clamping members 32 and 25 are once again separated and the tire removed from the device 70 to complete the process.

FIGURES 8 and 9 depict an alternate preferred embodiment of this invention which is particularly useful in retreading truck tires. Because of the weight of lower mold matrices used in retreading truck tires, it is impractical to have a vertically movable mounting plate to position the lower matrix relative to the tire. In this embodiment, the required positioning of the tire is effected with a stationary lower mold matrix. Tire centering apparatus 100 includes a ram assembly 102, tire positioning assembly 104, a lower mold matrix 106, a frame 108 and load counterbalancing assembly 110. As in the previous embodiments, frame 108 includes a mounting plate 111 which supports lower mold matrix 106.

Ram assembly 102 includes a cylinder 112 in which is disposed a vertically movable piston 114. A shaft 116 is attached to piston 114 and follows the latter's movement. Cylinder 112 is capped at its top by a cover 118 and at its bottom by a cover 120. Lower bead clamping member 122 is attached to ram assembly 102 through tie bolts 124. Tie bolts 124 secure bottom cover 120 to lower bead clamping member 122. Ram assembly 102 passes through cross member 125 of frame 108. Piston 114 and shaft 116 are positioned relative to cylinder 112 by pneumatic pressure acting on one side or the other of piston 114. The pneumatic pressure is supplied through a compressor 126. A line 128 communicates the outlet of compressor 126 to a three-position valve 130. Lines 132 and 134 extend from valve 130 into the upper and lower chambers of cylinder 112 respectively. Valve 130 is selectively operable to communicate the upper chamber and the lower chamber with compressor 126 as well as to terminate communication between the chambers and the compressor.

Tire positioning assembly 104 includes a pair of rams 136 and 138. Ram 136 includes a cylinder 140, a piston 142 and a shaft 143. Shaft 143 is secured to piston 142 and moves vertically in response to vertical movement of the piston within cylinder 140. Cylinder 140 is attached to frame 108 by means which are not shown. Similarly, ram 138 is attached to cross member 125 and includes a cylinder 144, a vertically movable piston 146 and a shaft 148. Shafts 143 and 148 are capable of engaging lower bead clamping member 122 to position it vertically. With vertical positioning of clamping member 122, ram assembly 102 moves an equivalent amount. The power to actuate rams 136 and 138 is provided by compressor 126. The outlet of compressor 126 is in communication with a two-way valve 150 through a line 152 and through a pair of lines 154 and 156 to the interior of cylinders 140 and 144. Valve 150 is operable to communicate both rams 136 and 138 with compressor 126 as well as to terminate such simultaneous communication.

As in the previously described embodiments, load counterbalancing assembly 110 supports the weight of the ram assembly responsible for drawing a tire's beads together and the unsupported weight of the tire, a curing rim and an air bag while the tire is being lowered into a lower mold matrix such as matrix 106. This assembly includes a pair of counterweights 158 and 160 which are attached to ram assembly 102 through cables 162 and 164 at lug 166. Lug 166 is attached to ram assembly 102 on bottom cover 120. Proper cable orientation with respect to ram assembly 102 and counterweights 158 and 160 is provided by pulleys 168, 170, and 172 and 174. Pulleys 168 and 170 are attached to frame 108 while pulleys 172 and 174 are attached to cylinder 112 of ram assembly 102.

The operation of the embodiment of the invention illustrated in FIGURES 8 and 9 will now be described with particular reference to FIGURE 9. To facilitate this description, FIGURE 9 depicts a tire 176 which includes a carcass 178 and a band of unvulcanized rubber 180 which has been cemented around the circumference of the carcass. An inflatable air bag 182 is in tire 176 as well as annular curing rim 184. The tire's beads, indicated by reference numerals 186 and 188, are engaged by lower bead clamping member 122 and a complementary upper bead clamping member 190. Locking ring 192 is secured to shaft 116 and retains upper bead clamping member 190 with shaft 116. During the mounting of tire 176 in the two bead clamping members, shafts 143 and 148 of rams 136 and 138 are in their vertically extended position to carry lower bead clamping member 122, the tire, curing rim and inflatable bag, upper bead clamping member 190 and ram assembly 102. Shafts 143 and 148 are maintained in their extended position by air pressure acting on pistons 142 and 146 (see FIGURE 8) supplied by compressor 126 through valve 150. After the tire has been mounted, shafts 143 and 148 are allowed to return to their inactivated position by bleeding the air in rams 136 and 138 to atmosphere. This inactivated position of the shafts is shown in phantom in FIGURE 9.

The removal of the support provided by shafts 143 and 148 allows ram assembly 102 and its carried weight, tire 176, upper and lower bead clamping members 190 and 122, curing rim 184 and bag 182, to be transferred to load counterbalancing assembly 110. Assembly 110 allows tire 176 to lower until the weight of the tire, curing rim and inflatable bag is borne by the parting surface of matrix 106 and the tire is symmetrically aligned with respect to its center plane.

After shafts 143 and 148 are returned to their lowered position and the tire, bead clamping members and ram assembly 102 have reached the equilibrium position with band 180 resting on the parting surface of matrix 106, shaft 116 of ram assembly 102 is lowered to draw beads 186 and 188 together by drawing bead clamping members 122 and 190 together. The bead clamping members are drawn together by the action of pneumatic pressure supplied by compressor 126 through valve 130 and line 132 on the upper surface of piston 114. As the beads are drawn together, progressively more and more of the weight originally carried by the parting surface of lower mold matrix 106 is transferred to ram assembly 102 by virtue of the diameter reduction of tire 176 allowing the collapsing tire to seat in the matrix. The final position of counterbalancing assembly 110, ram assembly 102 and lower bead clamping member 122 is shown in phantom in FIGURE 9.

While the instant invention has been described with reference to certain preferred embodiments, it is clear that those skilled in the art may well provide minor deviations from the process and apparatus described without departing from the spirit and scope of the appended claims.

What is claimed is:

1. In the art of tire retreading, an improvement in a tire retreading apparatus of the type including a frame; a mounting plate supported by the frame; a lower mold matrix supported by the mounting plate having a matrix cavity adapted to receive a tire when its beads are drawn close together, the lower mold matrix also having a parting surface; and means, including upper and lower bead clamping members, for drawing the beads of the tire close together to reduce the tire's diameter to allow the tire to be received in the matrix cavity in preparation for its retreading; the improvement comprising:

means, capable of cooperating with the lower bead clamping member and the lower mold matrix when a tire is initially supported along its periphery by the parting surface of the matrix and along its lower bead by the lower bead clamping member, for lowering the tire into the matrix cavity while supporting the tire in at least a substantially symmetrical condition, the lowering being in response to the increase in load on the lower bead clamping member produced as the diameter of the tire is being reduced.

2. The improvement claimed in claim 1, wherein the lowering means includes a counterbalance operatively disposed such that the load on the tire's beads is at least substantially offset by the counterbalance when the tire's periphery is supported by the parting surface of the mold matrix, the counterbalance being responsive to the increase in bead load occasioned by the reduction of the tire's diameter to allow the tire to lower into the matrix cavity.

3. The improvement claimed in claim 2, wherein the mounting plate has a vertically bored boss and the bead drawing means includes a fluid activated piston and cylinder capable of cooperating with the bead clamping members to draw such members close together, the cylinder being slidably received in the boss, and the counterbalance is capable of cooperating with the cylinder such that the cylinder lowers in response to the increase in bead load produced upon the reduction of the tire's diameter.

4. The improvement claimed in claim 3, wherein the counterbalance comprises a lever pivotally mounted on the frame and attached at one end to the cylinder, and a weight attached to the other end of the lever.

5. The improvement claimed in claim 3, wherein the counterbalance comprises at least one spring attached at its ends to the frame and cylinder.

6. The improvement claimed in claim 3, wherein the counterbalance comprises an inflatable bladder.

7. The improvement claimed in claim 4, including, as an additional element, means for raising and lowering the mounting plate with respect to the frame, the cylinder and the counterweight.

8. The improvement claimed in claim 7, wherein the raising and lowering means includes a second fluid activated piston and cylinder with the second cylinder mounted on the frame and the second piston attached to the mounting plate.

9. The improvement claimed in claim 3, wherein the mounting plate is fixed in stationary position with respect to the frame and including means for raising the fluid activated piston and cylinder above the lower mold matrix to allow the mounting of a tire with its beads between the bead clamping members and ejection of the tire from the lower mold matrix after it has been retreaded.

10. The improvement claimed in claim 9, wherein the fluid activated piston and cylinder raising means includes a second fluid activated piston and cylinder with the second cylinder mounted to the frame and the second piston coupled to the lower bead clamping member, the lower bead clamping member being rigidly attached to the first mentioned fluid activated cylinder.

11. A method for lowering a tire into a retreading mold matrix having a diameter less than the normal diameter of the tire, the method comprising the steps of:
supporting the periphery of the tire on the parting surface of the matrix;
engaging the beads of the tire between a pair of bead clamping members;
drawing the clamping members and tire beads close together to reduce the diameter of the tire and to gradually shift the load supported by the parting surface of the matrix to the clamping members; and
lowering, by the shift in load, the bead clamping members and the tire downwardly into the matrix cavity during the drawing together of the clamping members an amount related to the amount of reduction of the tire diameter such that the tire maintains a symmetrical cross-sectional configuration and tire droop is substantially completely eliminated.

12. The method claimed in claim 11, including the additional step of counterbalancing the load on the tire's beads, which load exists before the drawing step, such that such load is at least substantially offset and the tire beads are at least substantially free of axial stress.

13. The method claimed in claim 12, wherein the counterbalance step is accomplished through the use of a counterweight.

14. The method claimed in claim 11, including the additional step of raising the matrix up towards the tire, after the latter has been engaged by the bead clamping members but before the supporting of the tire's periphery, until the parting surface of the matrix contacts the periphery of the tire.

15. The method claimed in claim 12, including the additional step of raising the matrix up towards the tire, after the latter has been engaged by the bead clamping members but before the supporting of the tire's periphery, until the parting surface of the matrix contacts the periphery of the tire.

16. The method claimed in claim 12, wherein the supporting step is accomplished by lowering the tire, after it has been engaged by the bead clamping members but before such members are drawn close together, until the tire's periphery is supported on the parting surface of the matrix.

17. The improvement claimed in claim 3 wherein the mounting plate is fixed in a stationary position with respect to the frame, the cylinder is attached to the lower bead clamping member, and means is provided for raising the lower bead clamping member above the lower mold matrix to allow the mounting of a tire thereon and the subsequent ejection of the tire from the lower mold matrix after it has been retreaded.

18. The improvement claimed in claim 17 wherein the lower bead clamping member raising means includes a second fluid activated piston and cylinder mounted on the frame in position to raise the lower bead clamping member.

19. The improvement claimed in claim 18 wherein the lower bead clamping member raising means includes a shaft secured to the second piston in position to urge against the bottom of the lower bead clamping member.

References Cited

UNITED STATES PATENTS

| | | | |
|---|---|---|---|
| 2,110,293 | 3/1938 | Fisher | 18—18 |
| 2,559,119 | 7/1951 | Frank | 264—315 |
| 2,712,156 | 7/1955 | Potter et al. | 18—18 |
| 2,948,924 | 8/1960 | Clapp | 18—18 |
| 3,131,243 | 4/1964 | Fannen | 18—2 X |
| 3,184,794 | 5/1965 | Sherkin | 18—18 |
| 3,216,701 | 11/1965 | Badgett | 18—18 X |
| 3,240,653 | 3/1966 | Mattox et al. | 18—18 |

ROBERT F. WHITE, *Primary Examiner.*

N. RUSHEFSKY, *Assistant Examiner.*

U.S. Cl. X.R.

264—326; 18—2, 18